(12) United States Patent
Friedel et al.

(10) Patent No.: US 9,193,628 B2
(45) Date of Patent: Nov. 24, 2015

(54) CEMENTITIOUS MIXTURE FOR MATERIALS HAVING "EASY-TO-CLEAN" PROPERTIES BY MODIFICATION OF THE UNSET MATERIAL BY MEANS OF FLUORINE-CONTAINING ACTIVE INGREDIENTS

(75) Inventors: Manuel Friedel, Zürich (CH); Philipp Albert, Lörrach (DE); Burkhard Standke, Lörrach (DE); Spomenko Ljesic, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 485 days.

(21) Appl. No.: 13/638,734

(22) PCT Filed: Mar. 30, 2011

(86) PCT No.: PCT/EP2011/054922
§ 371 (c)(1),
(2), (4) Date: Dec. 17, 2012

(87) PCT Pub. No.: WO2011/121032
PCT Pub. Date: Oct. 6, 2011

(65) Prior Publication Data
US 2013/0087080 A1    Apr. 11, 2013

(30) Foreign Application Priority Data

Apr. 1, 2010   (DE) .............. 10 2010 003 589
Jun. 1, 2010   (DE) .............. 10 2010 029 588

(51) Int. Cl.
*C04B 24/42*   (2006.01)
*C04B 28/02*   (2006.01)
*C04B 24/00*   (2006.01)
C04B 111/20   (2006.01)
C04B 111/27   (2006.01)

(52) U.S. Cl.
CPC .............. *C04B 24/42* (2013.01); *C04B 24/005* (2013.01); *C04B 28/02* (2013.01); *C04B 2111/203* (2013.01); *C04B 2111/27* (2013.01)

(58) Field of Classification Search
CPC ................................. C04B 24/005
USPC ....................................... 106/724
See application file for complete search history.

(56) References Cited

U.S. PATENT DOCUMENTS

| | | | |
|---|---|---|---|
| 5,282,998 A | 2/1994 | Horn et al. | |
| 5,932,757 A | 8/1999 | Standke et al. | |
| 6,139,622 A | 10/2000 | Göbel et al. | |
| 6,268,423 B1 | 7/2001 | Mayer et al. | |
| 6,398,865 B1 | 6/2002 | Morita et al. | |
| 6,641,870 B2 | 11/2003 | Bartkowiak et al. | |
| 6,685,766 B2 | 2/2004 | Standke et al. | |
| 6,767,982 B2 | 7/2004 | Standke et al. | |
| 6,770,327 B2 | 8/2004 | Edelmann et al. | |
| 6,780,955 B2 | 8/2004 | Barfurth et al. | |
| 6,841,197 B2 | 1/2005 | Standke et al. | |
| 7,427,442 B2 | 9/2008 | Albert et al. | |
| 7,781,520 B2 | 8/2010 | Standke et al. | |
| 7,939,616 B2 | 5/2011 | Barfurth et al. | |
| 8,039,110 B2 | 10/2011 | Jenkner et al. | |
| 8,101,682 B2 | 1/2012 | Standke | |
| 8,147,918 B2 | 4/2012 | Standke et al. | |
| 8,188,266 B2 | 5/2012 | Edelmann et al. | |
| 8,298,679 B2 | 10/2012 | Albert et al. | |
| 8,394,972 B2 | 3/2013 | Wassmer et al. | |
| 2003/0051639 A1 | 3/2003 | Dams et al. | |
| 2006/0269752 A1* | 11/2006 | Holland et al. | ............... 428/407 |
| 2007/0054056 A1 | 3/2007 | Albert et al. | |
| 2007/0110912 A1 | 5/2007 | Standke | |
| 2008/0187673 A1 | 8/2008 | Standke et al. | |
| 2008/0206572 A1 | 8/2008 | Edelmann et al. | |
| 2009/0005518 A1 | 1/2009 | Just et al. | |
| 2009/0007818 A1 | 1/2009 | Militz et al. | |
| 2010/0119851 A1 | 5/2010 | Giessler-Blank et al. | |
| 2010/0159144 A1 | 6/2010 | Standke et al. | |
| 2010/0209719 A1 | 8/2010 | Borup et al. | |
| 2011/0124794 A1 | 5/2011 | Friedel et al. | |
| 2011/0259240 A1 | 10/2011 | Jenkner et al. | |
| 2011/0308423 A1 | 12/2011 | Friedel et al. | |

(Continued)

FOREIGN PATENT DOCUMENTS

| | | |
|---|---|---|
| EP | 0 919 526 | 6/1999 |
| EP | 1 086 935 | 3/2001 |

(Continued)

OTHER PUBLICATIONS

DE 10315270 (Holland et al.) Apr. 3, 2003. Abstract only.*

(Continued)

*Primary Examiner* — Paul Marcantoni
(74) *Attorney, Agent, or Firm* — Oblon, McClelland, Maier & Neustadt, L.L.P.

(57) ABSTRACT

The present invention relates to a hydraulically setting mixture comprising: a) 6% to 25% by weight of cement, b) 50% to 90% by weight of at least one aggregate, and c) 0.01% to 8% by weight of at least one fluoroorganyl-substituted silicon compound, and also to materials produced from this mixture, more particularly components, concrete articles or mouldings. The invention further relates to the use of a hydraulically setting mixture of the invention for producing materials, more particularly components, concrete articles or mouldings, for example as facing concrete, where the surface of the materials exhibits only relatively low soiling tendency ("easy-to-clean" property) even on abrasion.

22 Claims, No Drawings

(56) References Cited

U.S. PATENT DOCUMENTS

2012/0031302 A1 2/2012 Albert et al.
2012/0204762 A1 8/2012 Albert et al.
2014/0182487 A1 7/2014 Friedel et al.

FOREIGN PATENT DOCUMENTS

| EP | 1 262 464 | 12/2002 |
| EP | 1 982 964 | 10/2008 |
| WO | WO 2005/068401 A1 | 7/2005 |
| WO | WO 2008/062018 A1 | 5/2008 |
| WO | 2010 136286 | 12/2010 |
| WO | 2011 038956 | 4/2011 |
| WO | 2011 128127 | 10/2011 |
| WO | 2011 128129 | 10/2011 |

OTHER PUBLICATIONS

U.S. Appl. No. 14/111,185, filed Oct. 11, 2013, Friedel et al.
U.S. Appl. No. 14/358,437, filed May 15, 2014, Ljesic et al.
U.S. Appl. No. 14/007,481, filed Sep. 25, 2013, Albert et al.
International Search Report Issued Jul. 12, 2011 in PCT/EP11/54922 Filed Mar. 30, 2011.
U.S. Appl. No. 13/989,205, filed May 23, 2013, Friedel et al.
U.S. Appl. No. 13/580,194, filed Aug. 21, 2012, Borup et al.
U.S. Appl. No. 13/638,702, filed Oct. 25, 2012, Friedel et al.
U.S. Appl. No. 13/638,733, filed Oct. 1, 2012, Friedel et al.
U.S. Appl. No. 13/640,638, Oct. 11, 2012, Friedel et al.
U.S. Appl. No. 13/638,619, Oct. 11, 2012, Friedel et al.
U.S. Appl. No. 14/629,177, filed Feb. 23, 2015, Studte et al.

* cited by examiner

CEMENTITIOUS MIXTURE FOR MATERIALS HAVING "EASY-TO-CLEAN" PROPERTIES BY MODIFICATION OF THE UNSET MATERIAL BY MEANS OF FLUORINE-CONTAINING ACTIVE INGREDIENTS

The present invention relates to a specific hydraulically setting mixture such that a set or cured workpiece produced therefrom has dirt-repellant properties on the surface.

Hydraulically setting materials, for example cement-bonded materials, are used in numerous relevant places in modern building and construction, for example for the use of concrete paving slabs for driveways, footpaths/sidewalks or terraces. In the exterior sector in particular, soiling of the surfaces of such concrete paving slabs by a wide variety of materials, for example exhaust gases from traffic and industry, in particular soot, flower pollen, grass stains, oils, in particular motor oils, beverage and food residues, in particular cola, coffee, red wine or ketchup, and also as a result of the growth of microorganisms such as algae or fungi, is a great problem from an esthetic point of view. Given hydraulically set materials in such applications dirt-repellent properties [hereinafter also referred to as "easy-to-clean" or ETC] is therefore desirable.

The expression "dirt-repellent properties" refers to the ability of the surface to prevent intrusion of both aqueous and oily substances into the material and make removal of these substances from the surface easier.

It is known that easy-to-clean properties can be produced by after-treatment of finished, cured surfaces with various materials. Thus, inter alia, EP 0 838 467 teaches the use of a fluorine-containing silane or silane system for upgrading the surface. Disadvantages of such systems for the after-treatment of a surface are, firstly, the necessity of a further process step after production of such materials and, secondly, the durability of such coatings is frequently too low since they are detached as a result of weathering and abrasion.

It is also known that hydraulically cured materials, in particular cement-bonded materials, can be improved by addition of body modifiers. Thus, EP 0 913 370 teaches the use of aqueous, silane-containing emulsions for achieving water-repellent (hydrophobic) properties of such materials. Unfortunately, the teaching does not lead to the desired easy-to-clean surfaces.

U.S. Pat. No. 5,650,004 discloses a cement-bonded render mixture which is used for sealing of swimming pools. The water-repellent properties and improved durability of the render mixture are achieved by addition of silane-modified powders and pozzolanic fillers. A disadvantage of this render mixture is that although long-term water-repellent properties can be achieved, i.e. aqueous soiling can also be repelled, dirt-repellent properties in the above-described sense cannot be achieved.

DE 10 346 082 discloses hydraulically curing mixtures whose specific composition leads to an altered microstructure. This gives wear-resistant workpieces having surfaces which are to some extent dirt-repellent.

EP 1 445 242 discloses non-cement-bonded renders and coatings for exterior walls, which renders/coatings have dirt-repellent properties. The dirt-repellent properties are achieved by reducing the microroughness in such a way that dirt particles cannot penetrate into the pores and settle there. A disadvantage is that non-cement-bonded render mixtures based on potassium water glass are modified as such.

It was an object of the present invention to provide a further hydraulically setting mixture, in particular cement-bonded mixture, which is such that the surface of a material produced therefrom has sufficiently good dirt-repellent properties after setting or curing and these are very durable.

This object is achieved according to the invention by the features of the claims.

It has now surprisingly been found that the addition of at least one fluoroorganyl-substituted silicon compound, in particular a fluoroorganyl-substituted silane and/or fluoroorganyl-substituted siloxane, to a hydraulically setting mixture, in particular an otherwise conventional concrete mixture, enables durable ETC properties of a hydraulically set and cured material produced therefrom to be achieved.

The fluoroorganyl-substituted silane or fluoroorganyl-substituted siloxane or a preparation based thereon containing a fluoroorganyl-substituted silicon compound which is used in this way preferably has a liquid, for example oil-like, to cream-like or paste-like, consistency.

The present invention accordingly provides a hydraulically setting mixture, in particular for materials having easy-to-clean properties, comprising:

a) from 6 to 25% by weight, preferably from 10 to 20% by weight, particularly preferably from 12 to 18% by weight, of cement,
b) from 50 to 90% by weight, preferably from 65 to 85% by weight, particularly preferably from 70 to 80% by weight, of at least one aggregate and
c) from 0.01 to 8% by weight, preferably from 0.02 to 5% by weight, particularly preferably from 0.05 to 2% by weight, of at least one fluoroorganyl-substituted silicon compound.

Here, the mixture of constituents or components used in each case add up to 100% by weight.

It is provided that, depending on the specific choice of mixture constituents in each case, the general amount limits specified under a), b) and c) be adhered to.

The fluoroorganyl-substituted silicon compounds used according to the invention are preferably selected from the group consisting of fluoroorganyl-substituted silanes and fluoroorganyl-substituted siloxanes and mixtures thereof. In particular, they are preferably selected from the group consisting of monomeric fluoroalkyl-substituted silanes and fluoroalkyl-substituted siloxanes and mixtures thereof. Preferred examples of a monomeric fluoroalkyl-substituted silane are 3,3,4,4,5,5,6,6,7,7,8,8,8-tridecafluorooctyltrimethoxysilane and 3,3,4,4,5,5,6,6,7,7,8,8,8-tridecafluorooctyltriethoxysilane. According to the invention, preparations based on mixtures based on at least one abovementioned monomeric fluoroalkyl-substituted silane or fluoroalkyl-substituted siloxane and optionally at least one further organosilane or organosiloxane, in particular a $C_1$-$C_{16}$-alkyltrialkoxysilane, for example methyl-, propyl-, butyl-, octyl-, hexadecyltrimethoxysilane or -triethoxysilane, to name only a few, or an oligomeric organoalkoxysilane can also be appropriately used as fluoroorganyl-substituted silicon compounds, where such preparations are selected from the group consisting of water-, alcohol- and/or hydrocarbon-containing solutions or emulsions. Such preparations are, for example but not exclusively, to be found in DE 196 06 011, EP 0 538 555, EP 0 675 128, EP 0 716 127, EP 0 716 128, EP 0 832 911, EP 0 846 717, EP 0 953 591, EP 0 960 921, EP 1 033 395, EP 1 101 787, EP 1 193 302, WO 2006/010666, WO 2006/010388, WO 2009/030538.

An additional advantage of the fluoroorganyl-substituted silicon compounds used according to the invention is that silanes often have a fluidizing effect on preparations. The fluoroorgano systems used here surprisingly do not have an adverse effect on the green solidity.

In addition, a hydraulically setting mixture according to the invention can advantageously additionally comprise, as further components, d) from 0.01 to 2% by weight, preferably from 0.05 to 0.5% by weight, of plasticizers, and/or
e) from 0.01 to 1% by weight of at least one further auxiliary.

As cement, all customary cements selected from the group consisting of portland cements, composite cements, cements having proportions of pozzolans such as fly ash or microsilica and blast furnace cements can be used or present in a mixture according to the invention. Thus, the cement in a mixture according to the invention is preferably, but not exclusively, selected from the group consisting of portland cements, composite cements and blast furnace cements.

Aggregates in a mixture according to the invention can be, for example, rock particle size fractions in accordance with EN 206-1:2000. In particular, aggregates can be agglomerates, sands, gravels, crushed material, porphyry, quartz flour, ground limestone and ground rock or mixtures thereof, and also fly ashes, microsilica and other siliceous additives or mixtures thereof. Here, sands can be, for example, silica sands or river sands. Preference is given to gravels, crushed material, crushed sands, porphyry, quartz flour, ground limestone and ground rock or mixtures thereof. Thus, a mixture according to the invention can advantageously contain aggregates which preferably have a maximum particle size of from 8 to 63 mm particularly preferably 8 mm, 16 mm, 32 mm or 63 mm, in particular aggregates having a maximum particle size of 32 mm, in accordance with DIN 1045-2. Particular preference is given to the aggregate being an agglomerate having a maximum particle size of 32 mm and/or sand having a maximum particle size of 5 mm.

Thus, a mixture according to the invention can generally be produced in a simple and economical way by combining and mixing the components according to the claims. Thus, a mixture according to the invention can typically be admixed with water and mixed in a mixing apparatus. In general, a hydraulically setting mixture can firstly be provided by mixing of the components according to the present main claim. Further components, which have been listed above, can be added to this mixture when it is combined with an amount of water according to the claim during use, optionally with good mixing using apparatuses or vessels known per se to those skilled in the art, and the resulting mixture or a composition produced in this way can be introduced into a desired mold and allowed to hydraulically set and cure.

Fluoroorganyl-substituted silicon compounds according to the invention can be (i) compounds which are derived from the general formulae I, II, III, IV and/or V and can have crosslinking structural elements which form chain-like, cyclic, crosslinked and/or three-dimensionally crosslinked structures, where at least one structure in idealized form corresponds to the general formula I

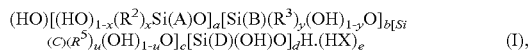

where, in formula I, the structural elements are derived from alkoxysilane of the general formulae II, III, IV and/or V and A corresponds to an aminoalkyl radical $H_2N(CH_2)_f(NH)_g(CH_2)_h(NH)_m(R^7)_n$— in the structural element derived from the general formula II,

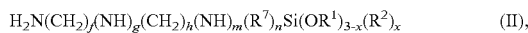

where f is an integer in the range from 0 to 6, where g=0 when f=0 and g=1 when f>0, h is an integer in the range from 0 to 6, x=0 or 1, m=0 or 1 and n=0 or 1, where n+m=0 or 2 in formula II, and $R^7$ is a linear, branched or cyclic divalent alkyl group having from 1 to 16 carbon atoms, B corresponds to a fluoroalkyl radical $R^4$—Y—$(CH_2)_k$— in the structural element derived from the general formula III,

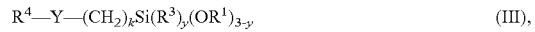

where $R^4$ is a monofluorinated, oligofluorinated or perfluorinated alkyl group having from 1 to 9 carbon atoms or a monofluorinated, oligofluorinated or perfluorinated aryl group, Y is a $CH_2$, O or S group, $R^3$ is a linear, branched or cyclic alkyl group having from 1 to 8 carbon atoms or an aryl group, k=0, 1 or 2 and y=0 or 1 in formula III and/or VI, $R^4$ is preferably $F_3C(CF_2)_r$—, where r=0 to 18, preferably r=5, where Y is a $CH_2$ or O group, and k is preferably 1 with Y=—$CH_2$—, C corresponds to an alkyl radical $R^5$— in the structural element derived from the general formula IV,

where $R^5$ is a linear or branched alkyl group having from 1 to 4 carbon atoms, in particular methyl, and u=0 or 1 in formula IV, D corresponds to an alkyl radical $R^6$— in the structural element derived from the general formula IV,

where $R^6$ in the abovementioned formulae is a linear, branched or cyclic alkyl group having from 1 to 8 carbon atoms and the radicals $R^1$ in the formulae II, III, IV, V and/or VI are each, independently of one another, a linear, branched or cyclic alkyl group having from 1 to 8 carbon atoms or an aryl group, and $R^1$ is preferably, independently, methyl, ethyl or propyl; where $R^2$, $R^3$ and/or $R^5$ in the abovementioned formulae each correspond, independently of one another, to a linear or branched alkyl radical having from 1 to 4 carbon atoms, preferably independently of one another methyl or ethyl, and in formula (I), HX is an acid, where X is an inorganic or organic acid radical, where x, y and u are each, independently of one another, 0 or 1 and a, b, c, d and e are each, independently of one another, integers where a≥0, b≥0, c≥0, d≥0, e≥0 and (a+b+c+d)≥2, preferably (a+b+c+d)≥4, particularly preferably (a+b+c+d)≥10, where X is, for example, chloride, nitrate, formate or acetate, or (ii) compounds in which the organosiloxanes are cocondensates or block cocondensates or mixtures of these derived from at least two of the abovementioned alkoxysilanes of the general formulae II, III, IV and V, preferably derived in a molar ratio of 1:≤3.5 from the formulae II and III or else where a, b, c and d in the mol of the alkoxysilanes of the formulae II, III, IV and V with a molar ratio of 0.1≤[a/b+c+d], in particular 0.25≤[a/b+c+d]≤6000, preferably 1≤[a/b+c+d]≤3 where a>0, b>0, c≥0 and d≥0, or (iii) monomeric fluoroorganyl-substituted silicon compounds of the general formula VI

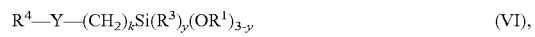

where $R^4$, Y, $R^1$, $R^3$, k and y are as defined above, and/or mixtures of a plurality of monomeric compounds of the general formula VI.

The fluoroorganyl-substituted silicon compounds used according to the invention can be present in liquid or dissolved form or dispersed or emulsified in water or in paste-like or cream-like form. It has been found that the substances can then be incorporated particularly well and homogeneously into the mixture according to the invention.

Said fluoroorganyl-substituted silicon compounds can advantageously also be used in the form of an aqueous preparation, e.g. as aqueous solution, or dispersion or emulsion. The ability to be incorporated into the aqueous, cement-containing mixtures can be additionally simplified in this way. Such aqueous preparations can be, in particular, aqueous dispersions or emulsions of a fluoroorganyl-substituted silane and/or siloxane which have a total content of fluoroorganyl-substituted silicon compound of from 2.5% by weight to 90% by weight, preferably from 5% by weight to 80% by weight, particularly preferably from 5% by weight to 70% by weight, very particularly preferably from 10% by weight to 60% by weight (in each case based on the total mass of the aqueous emulsion).

If fluoroorganyl-substituted silicon compounds used according to the invention are present in the form of an aqueous emulsion, this can contain at least one emulsifier which is advantageously selected from the group consisting of alkylsulfates having $C_8$-$C_{18}$-alkyl, alkyl and alkaryl ether sulfates having $C_8$-$C_{18}$-alkyl in the hydrophobic radical and having from 1 to 40 ethylene oxide (EO) or propylene oxide (PO) units, alkylsulfonates having $C_8$-$C_{18}$-alkyl, alkarylsulfonates having $C_8$-$C_{18}$-alkyl, and monoesters of sulfosuccinic acid with monohydric alcohols or alkylphenols having from 5 to 15 carbon atoms, alkali metal and ammonium salts of carboxylic acids having from 8 to 20 carbon atoms in the alkyl, aryl, alkaryl or aralkyl radical, alkylphosphates and alkarylphosphates having from 8 to 20 carbon atoms in the organic radical, alkyl ether and alkaryl ether phosphates having from 8 to 20 carbon atoms in the alkyl or alkaryl radical and from 1 to 40 EO units, alkyl polyglycol ethers and alkaryl polyglycol ethers having from 8 to 40 EO units and from 8 to 20 carbon atoms in the alkyl or aryl radicals, ethylene oxide-propylene oxide (EO-PO) block copolymers having from 8 to 40 EO or PO units, addition products of alkylamines having $C_8$-$C_{22}$-alkyl radicals with ethylene oxide or propylene oxide, alkyl polyglycosides having linear or branched saturated or unsaturated $C_8$-$C_{24}$-alkyl radicals and oligoglycoside radicals having from 1 to 10 hexose or pentose units, silicon-functional surfactants and mixtures of these emulsifiers. The emulsifier content of such an emulsion is preferably from 0.01 to 5% by weight, based on the total weight of the emulsion.

In addition, an aqueous composition of a fluoroorganyl-substituted silicon compound used according to the invention can advantageously also contain customary auxiliaries selected from among inorganic or organic acids, buffer substances, fungicides, bactericides, algicides, microbiocides, odorous substances, corrosion inhibitors, preservatives, rheological auxiliaries.

If used, siliceous additives can advantageously be selected from the group consisting of microsilica, fly ash, flame silicas, precipitated silicas, zeolites, crystalline silicas, silica sols, kaolin, mica, kieselguhr, diatomaceous earth, talc, wollastonite and clay and mixtures of corresponding microsilica, fly ash, flame silicas, precipitated silicas, zeolites, crystalline silicas, silica sols, kaolin, mica, kieselguhr, diatomaceous earth, talc, wollastonite or clay and aqueous dispersions of at least one pyrogenic silica or at least one precipitated silica or a mixture of pyrogenic and precipitated silicas.

Naturally, water is also typically present in the hydraulically setting mixture of the invention or is added thereto. The amount of water is preferably from 1 to 20% by weight.

If the fluoroorganyl-substituted silicon compound used according to the invention is used in the form of an aqueous preparation, it is advantageous to take into account only the proportion of active compound in the respective aqueous composition as fluoroorganyl-substituted silicon compound according to the invention for calculating the total composition of the cement-bonded mixture. The water content of these aqueous preparations is advantageously taken into account in calculating the amount of water which needs to be added.

Plasticizers can be all conventional flow improvers, in particular polycarboxylate ethers (PCEs) and/or polymethyl methacrylates and also lignosulfonates or naphthalene formaldehyde-sulfonates.

Hydraulically setting mixtures according to the invention can contain, as further auxiliaries, for example, dispersants and wetting agents, for example siliconates or alkylphosphonates, antifoams, for example trialkylphosphates, air pore formers such as hydrolyzed resin acids, retarders and accelerators, for example formates, and/or water reducers.

Hydraulically setting mixtures according to the invention can advantageously be used in the concrete industry, in which they are mixed in conventional mechanical mixers.

It can be advantageous to premix the cement and the solid aggregates, likewise premix optionally liquid, nonaqueous components with the cement and add aqueous formulations such as a solution or an aqueous dispersion or emulsion according to the invention of a fluoroorganyl-substituted silicon compound, however together with the make-up water. Such formulations can advantageously be predispersed in the make-up water. The content of additionally introduced water can advantageously be taken into account in the setting of the desired w/c value. The processability of the mixtures according to the invention is advantageously unchanged compared to unmodified mixtures.

However, it is also possible to place a solids mixture of a hydraulically setting mixture according to the invention in a mechanical mixer and add a defined amount of water all at once or in portions and mix the whole.

A hydraulically setting mixture according to the invention which has been obtained in this way can then be subjected to shaping and curing as is known per se to a person skilled in the art to give articles whose surfaces advantageously have, in the sense of the invention, only a small soiling tendency (easy-to-clean property) even in the case of abrasion.

The present invention thus also provides materials, in particular components, concrete goods or moldings which can be obtained using a hydraulically setting mixture according to the invention.

The present invention further provides for the use of a hydraulically setting mixture according to the invention for producing materials, in particular components, concrete goods or moldings, whose surface has only a small soiling tendency (easy-to-clean property) even in the case of abrasion.

The present invention likewise provides for the use of a fluoroorganyl-substituted silicon compound, in particular one as specified in more detail above, for the body modification of a hydraulically setting mixture, in particular a mixture containing from 6 to 25% by weight of cement, from 50 to 90% by weight of at least one aggregate and optionally from 1 to 20% by weight of water and/or from 0.01 to 2% by weight of plasticizer and/or from 0.01 to 1% by weight of at least one further auxiliary.

Thus, a hydraulically setting mixture according to the invention can advantageously be used in the building sector, in particular for producing workpieces, for concrete paving slabs, or as facing concrete, in particular in facings for paving slabs.

It can be stated that the manufacturers of cement-bonded workpieces, in particular the manufacturers of concrete slabs, have to the present day had great interest in lastingly modifying hydraulically setting, in particular cement-bonded, workpieces and ensuring easy-to-clean properties of the surface despite abrasion and weathering effects.

The provision and use of mixtures according to the invention enables, due to the newly achieved lasting easy-to-clean properties of hydraulically cured workpieces despite abrasion and weathering, cleaning and maintenance costs for prolonged cleaning cycles to be significantly reduced. Such body modifications can advantageously be carried out, in particular, in ongoing operation of a production factory and the workpieces can be shipped in finished, protected form. An additional outlay on the building site is dispensed with.

However, compositions according to the invention can also be produced and advantageously used on the site of an application.

The invention is illustrated by the following examples, without the subject matter of the invention being restricted.

EXAMPLES

The mortar test specimens used were made from a commercial universal mortar (mortar group II in accordance with DIN V 18580, mortar group P II in accordance with DIN V 18550) from Quick-Mix. For this purpose, about 100 g of the mortar was in each case intimately mixed by stirring with about 24 ml of water. The additive indicated in each case in the examples was predispersed in the make-up water. The mixture formed was introduced into PE formwork, dried at 25° C. for 24 hours, subsequently removed from the formwork and cured at 25° C. for 28 days. The soiling properties were determined by a method based on DIN EN ISO 10545-14; the test is described in more detail below.

Amounts in % by weight are in each case based on the weight of the complete dry mixture.

The preparation of the fluoroalkylsilane-based additive can be carried out as described in example 1 of DE 199 55 047:

Preparation of a water-soluble condensate or cocondensate of DYNASYLAN® TRIAMO (N-[N'-(2-aminoethyl)-2-aminoethyl]-3-aminopropyltrimethoxysilane) and DYNASYLAN® F 8261 (tridecafluor-1,1,2,2-tetrahydrooctyltriethoxysilane) in a molar ratio of 1:3

Apparatus:

Heatable stirred reactor with distillation device, internal thermometer, metering device Balance:

Starting Materials

| | | |
|---|---|---|
| m(DYNASYLAN ® TRIAMO) = | 26.5 g | 0.1 mol |
| m(DYNASYLAN ® F 8261) = | 153.0 g | 0.3 mol |
| m(ethanol) = | 60.0 g | |
| m(water) = | 10.9 g | 1.5 mol/mol of Si (prehydrolysis) |
| m(formic acid) = | 16.3 g | 0.3 mol (Biesterfeld, 85%) |
| m(water) = | 860.0 g | |
| Weights obtained | | |
| m(distillate) = | 113.0 g | |
| m(product) = | 1 020.0 g | |

Procedure:

26.5 g of TRIAMO, 153.0 g of F 8261 and 60 g of ethanol are placed in the reactor and stirred under reflux (about 80° C.) for 2 hours. The water for the prehydrolysis is subsequently introduced at about 50° C. The reaction mixture is hydrolyzed under reflux (about 78° C.) for 8 hours. 16.3 g of formic acid (85%) are then introduced at about 50° C. and 860 g of water are added. The product is then slightly turbid. The hydrolysis alcohol formed and the 60 g of ethanol are distilled off under reduced pressure.

Pressure: 160-130 mbar

Internal temperature: 48-50° C.

Examination of the product by means of 29-Si-NMR analysis indicated:

| | |
|---|---|
| 12.9 mol % of Si - | monomeric silane (triamino-functional) and M structures (triamino-functional) |
| 9.2 mol % of Si - | M structures (fluoroalkyl-functional) and D structures (triamino-functional), |
| 68.1 mol % of Si - | D structures (fluoroalkyl-functional) and T structures (triamino-functional). |

Furthermore, an average particle size $D_{50}$ of 0.0374 µm (laser light scattering) was determined.

Example 1 Comparative Example

A mortar test specimen was produced as described above. No additives were used.

Example 2

A mortar test specimen was produced as described above. 3% by weight of the aqueous fluoroalkylsilane formulation prepared as described above in example 1 of DE 19955047 was dispersed in the make-up water before it was added.

Example 3

A mortar test specimen was produced as described above. 3% by weight of 3,3,4,4,5,5,6,6,7,7,8,8,8-tridecafluorooctyltriethoxysilane was dispersed in the make-up water before it was added.

Example 4 Comparative Example

A mortar test specimen was produced as described above. 2% by weight of an O/W emulsion containing 50% by weight of an octyltriethoxysilane was dispersed in the make-up water before it was added.

Evaluation

Easy-To-Clean Properties:

A drop (about 0.5 ml) of each of the soiling agents coffee (black, with sugar, cold), cola, red wine and olive oil was applied to the surface of the cured mortar test specimen (not to the formwork side). After a time of 1 hour at 25° C., the surface was dabbed dry with a soft cloth and rinsed with deionized water for 3 minutes. Finally, the water is dabbed off with a soft cloth and the soiling of the surface was visually assessed after drying. Here, 5 means that no soiling is visible, 4 means that soiling is barely visible, 3 means that soiling is visible, 2 means that soiling is clearly visible and 1 means that soiling is very obviously visible. Easy-to-clean properties can only be considered to be present when a significant improvement compared to an untreated comparative specimen is achieved. Very good easy-to-clean properties can be considered to be present when the 3 aqueous soiling agents (coffee, cola, red wine) each achieve 4 or 5 and at the same time olive oil achieves a significant improvement compared to an untreated comparative specimen. The results of the soiling test are shown In table 1.

TABLE 1

Results of the soiling test

| Example | Soiling with coffee (with sugar) | Soiling with cola | Soiling with red wine | Soiling with olive oil |
|---|---|---|---|---|
| 1 | 1 | 5 | 1 | 1 |
| 2 | 3 | 4 | 3 | 3 |
| 3 | 4 | 5 | 4 | 4 |
| 4 | 2 | 4 | 1 | 1 |

It is clear that, according to the above definition, very good easy-to-clean properties are achieved when using the mixture according to the invention of example 3 and good easy-to-clean properties are still achieved when using the mixture according to the invention of example 2. On the other hand, the comparative mixture 4, which contains exclusively fluorine-free alkylsilane, displays no improvement in the cleaning properties.

The invention claimed is:

1. A hydraulically setting mixture comprising:
  a) 6 to 25% by weight of cement,
  b) 50 to 90% by weight of at least one aggregate, and
  c) 0.01 to 8% by weight of at least one fluoroorganyl-substituted silicon compound.

2. The mixture of claim 1, further comprising
  d) 0.01 to 2% by weight of a plasticizer,
  e) 0.01 to 1% by weight of at least one further auxiliary, or both d) and e).

3. The mixture of claim 1, wherein
  the cement is selected from the group consisting of a portland cement, a composite cement, a cement comprising a pozzolan, and a blast furnace cement.

4. The mixture of claim 1, wherein
  the aggregate is at least one selected from the group consisting of an agglomerate, a sand, a gravel, a crushed material, porphyry, quartz flour, ground limestone, ground rock, fly ashes, microsilica, and a siliceous additive.

5. The mixture of claim 1, wherein
  the fluoroorganyl-substituted silicon compound is at least one selected from the group consisting of a fluoroorganyl-substituted silane and a fluoroorganyl-substituted siloxane.

6. The mixture of claim 1, wherein the fluoroorganyl-substituted silicon compound is selected from the group consisting of
  (i) a compound derived from formulae I, II, III, IV and/or V, optionally having a crosslinking structural element which forms a chain, cyclic, crosslinked and/or three-dimensionally crosslinked structure, where at least one structure in idealized form corresponds to formula I, $$(HO)[(HO)_{1-x}(R^2)_xSi(A)O]_a[Si(B)(R^3)_y(OH)_{1-y}O]_b[Si(C)(R^5)_u(OH)_{1-u}O]_c[Si(D)(OH)O]_dH\cdot(HX)_e \quad (I)$$

where, in formula I, the structural element is derived from alkoxysilane of the formulae II, III, IV and/or V and A corresponds to an aminoalkyl radical $H_2N(CH_2)_f(NH)_g(CH_2)_h(NH)_m(R^7)_n$— in the structural element derived from the general formula II, $$H_2N(CH_2)_f(NH)_g(CH_2)_h(NH)_m(R^7)_nSi(OR^1)_{3-x}(R^2)_x \quad (II),$$

where f is an integer of 0 to 6, where g=0 when f=0 and g=1 when f>0, h is an integer of 0 to 6, x=0 or 1, m=0 or 1 and n=0 or 1, where n+m=0 or 2 in formula II, and $R^7$ is a linear, branched or cyclic divalent alkyl group having from 1 to 16 carbon atoms B corresponds to a fluoroalkyl radical $R^4$—Y—$(CH_2)_k$— in the structural element derived from the formula III, $$R^4-Y-(CH_2)_kSi(R^3)_y(OR^1)_{3-y} \quad (III),$$

where $R^4$ is a monofluorinated, oligofluorinated or perfluorinated alkyl group having from 1 to 9 carbon atoms or a monofluorinated, oligofluorinated or perfluorinated aryl group, Y is a $CH_2$, O or S group, $R^3$ is a linear, branched or cyclic alkyl group having from 1 to 8 carbon atoms or an aryl group, k=0, 1 or 2 and y=0 or 1 in formula III and/or VI, C corresponds to an alkyl radical $R^5$— in the structural element derived from the formula IV, $$R^6-Si(R^5)_u(OR^1)_{3-u} \quad (IV),$$

where $R^5$ is a linear or branched alkyl group having from 1 to 4 carbon atoms, D is an alkyl radical $R^6$— in the structural element derived from the formula IV, $$R^6-Si(OR^1)_3 \quad (V),$$

where $R^6$ in the abovementioned formulae is a linear, branched or cyclic alkyl group having from 1 to 8 carbon atoms, and the radicals $R^1$ in the formulae II, III, IV, V and/or VI are each, independently of one another, a linear, branched or cyclic alkyl group having from 1 to 8 carbon atoms or an aryl group; where $R^2$, $R^3$ and/or $R^5$ in the abovementioned formulae each correspond, independently of one another, to a linear or branched alkyl radical having from 1 to 4 carbon atoms, and in formula (I), HX is an acid, where X is an inorganic or organic acid radical, where x, y and u are each, independently of one another, 0 or 1 and a, b, c, d and e are each, independently of one another, integers where a≥0, b≥0, c≥0, d≥0, e≥0 and (a+b+c+d)≥2, (ii) a compound in which the organosiloxanes are cocondensates or block cocondensates or mixtures of these derived from at least two of the abovementioned alkoxysilanes of the general formulae II, III, IV and V, (iii) a monomeric fluoroorganyl-substituted silicon compound of the formula VI $$R^4-Y-(CH_2)_kSi(R^3)_y(OR^1)_{3-y} \quad (VI),$$

where $R^4$, Y, $R^1$, $R^3$, k and y are as defined above, and a mixture of a plurality of monomeric compounds of the formula VI.

7. The mixture of claim 1, wherein
  the fluoroorganyl--substituted silicon compound is present as a liquid monomeric compound or in solution or as an aqueous dispersion or emulsion or as a paste or cream preparation.

8. The mixture of claim 1, further comprising 1 to 20% by weight of water.

9. A process for producing a mixture, comprising admixing the mixture of claim 1 with water in a mixing apparatus.

10. A material comprising the mixture of claim 1.

11. A facing concrete comprising the mixture of claim 1.

12. A process of modifying a hydraulically setting mixture, comprising contacting the mixture with a fluoroorganyl-substituted silicon compound, thereby obtaining the mixture of claim 1.

13. A component, concrete product or molding comprising the mixture of claim 1.

14. The mixture of claim 1, wherein the aggregate comprises an agglomerate having a maximum particle size of 32 mm.

15. The mixture of claim 1, wherein the aggregate comprises a sand having a maximum particle size of 5 mm.

16. The mixture of claim 1, wherein the fluoroorganyl-substituted silicon compound comprises a monomeric fluoroalkyl-substituted silane.

17. The mixture of claim 1, wherein the fluoroorganyl-substituted silicon compound comprises a monomeric fluoroalkyl-substituted siloxane.

18. The mixture of claim 1, comprising:
a) 10 to 20% by weight of cement,
b) 65 to 85% by weight of the at least one aggregate, and
c) 0.02 to 5% by weight of the at least one fluoroorganyl-substituted silicon compound.

19. The mixture of claim 1, comprising:
a) 12 to 18% by weight of cement,
b) 70 to 80% by weight of the at least one aggregate, and
c) 0.05 to 2% by weight of the at least one fluoroorganyl-substituted silicon compound.

20. The mixture of claim 2, comprising:
d) 0.05 to 0.5% by weight of a plasticizer,
e) 0.01 to 1% by weight of at least one further auxiliary, or both d) and e).

21. The mixture of claim 6, wherein the fluoroorganyl-substituted silicon compound is a compound of formula VI or a mixture of a plurality of compounds of formula VI.

22. The mixture of claim 6, wherein the fluoroorganyl-substituted silicon compound is a compound derived from a compound of formula I, optionally having a crosslinking structural element forming a chain, cyclic, crosslinked, and/or three-dimensionally crosslinked structure.

* * * * *